(12) United States Patent
Kaneko et al.

(10) Patent No.: US 11,489,149 B2
(45) Date of Patent: Nov. 1, 2022

(54) ELECTRODE, ENERGY STORAGE DEVICE, AND METHOD FOR MANUFACTURING ELECTRODE

(71) Applicant: GS Yuasa International Ltd., Kyoto (JP)

(72) Inventors: Ryosuke Kaneko, Kyoto (JP); Tetsuya Murai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 15 days.

(21) Appl. No.: 16/632,027

(22) PCT Filed: Jul. 17, 2018

(86) PCT No.: PCT/JP2018/026716
§ 371 (c)(1),
(2) Date: Jan. 17, 2020

(87) PCT Pub. No.: WO2019/017331
PCT Pub. Date: Jan. 24, 2019

(65) Prior Publication Data
US 2020/0152969 A1    May 14, 2020

(30) Foreign Application Priority Data
Jul. 18, 2017 (JP) .............................. JP2017-139046

(51) Int. Cl.
*H01M 4/36*      (2006.01)
*H01M 4/62*      (2006.01)
*H01M 4/1397*    (2010.01)
*H01M 10/0562*   (2010.01)
*H01M 50/409*    (2021.01)
*H01M 10/0525*   (2010.01)

(52) U.S. Cl.
CPC ......... *H01M 4/1397* (2013.01); *H01M 4/366* (2013.01); *H01M 4/621* (2013.01); *H01M 4/624* (2013.01); *H01M 10/0562* (2013.01); *H01M 50/409* (2021.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 4,851,479 A * | 7/1989 | Blaise | ................... | C08F 214/22 525/276 |
| 5,508,205 A * | 4/1996 | Dominguez | ...... | B32B 17/10036 136/251 |
| 5,759,715 A * | 6/1998 | Barker | ................... | H01M 4/485 429/331 |
| 7,422,825 B2 * | 9/2008 | Inoue | ................... | H01M 50/449 429/246 |
| 2002/0168569 A1 | 11/2002 | Barriere et al. | | |
| 2006/0216608 A1 | 9/2006 | Ohata et al. | | |
| 2006/0222940 A1 * | 10/2006 | Fujikawa | ............ | H01M 50/171 429/176 |
| 2007/0264577 A1 | 11/2007 | Katayama et al. | | |
| 2009/0169986 A1 | 7/2009 | Fukunaga et al. | | |
| 2012/0021264 A1 | 1/2012 | Morishima | | |
| 2013/0260207 A1 | 10/2013 | Uemura | | |
| 2013/0309414 A1 | 11/2013 | Eskra et al. | | |
| 2014/0265554 A1 * | 9/2014 | Yang | ....................... | B60L 58/15 307/9.1 |
| 2014/0295263 A1 * | 10/2014 | Iwama | .................. | H01M 50/46 429/211 |
| 2015/0243964 A1 * | 8/2015 | Yu | ..................... | H01M 10/0567 429/233 |
| 2015/0270544 A1 * | 9/2015 | Yoshida | .............. | H01M 4/5825 429/209 |
| 2016/0118636 A1 | 4/2016 | Jin et al. | | |
| 2016/0126551 A1 * | 5/2016 | Sasaki | ............... | H01M 10/0525 429/217 |
| 2016/0240829 A1 | 8/2016 | Eskra et al. | | |
| 2021/0328207 A1 | 10/2021 | Eskra et al. | | |

FOREIGN PATENT DOCUMENTS

| | | | |
|---|---|---|---|
| CN | 104303343 A | 1/2015 | |
| CN | 105324870 A | 2/2016 | |
| JP | 2004-265874 A | 9/2004 | |
| JP | 2006-139978 A | 6/2006 | |
| JP | 2007-95344 A | 4/2007 | |
| JP | 2009-163942 A | 7/2009 | |
| JP | 2013-97912 A | 5/2013 | |
| JP | 2016-115457 A | 6/2016 | |
| JP | 2017-216128 A | 12/2017 | |
| WO | 2005-011043 A1 | 2/2005 | |
| WO | 2010-116533 A1 | 10/2010 | |
| WO | 2012-081543 A1 | 6/2012 | |
| WO | WO 2016/010600 | * | 1/2016 |

OTHER PUBLICATIONS

International Search Report dated Oct. 23, 2018 filed in PCT/JP2018/026716.

* cited by examiner

*Primary Examiner* — Anca Eoff
(74) *Attorney, Agent, or Firm* — Rankin, Hill & Clark LLP

(57) ABSTRACT

An aspect of the present invention is an electrode which includes an active material layer, and an insulating layer layered on a surface of the active material layer, in which the insulating layer contains a filler and a first binder, and a content of the first binder in the insulating layer is 8% by mass or more. Another aspect of the present invention is an electrode which includes an active material layer, and an insulating layer layered on a surface of the active material layer, in which the insulating layer is a dry coating product containing a filler and a binder. Still another aspect of the present invention is a method for manufacturing an electrode, which includes the steps of forming an active material layer, and laminating an insulator containing a filler and a binder on a surface of the active material layer to form an insulating layer, in which the insulator does not contain a solvent.

2 Claims, 2 Drawing Sheets

ELECTRODE, ENERGY STORAGE DEVICE, AND METHOD FOR MANUFACTURING ELECTRODE

CROSS-REFERENCE TO RELATED APPLICATIONS

The instant application is a National Stage entry of the international application No. PCT/JP2018/026716 filed on Jul. 17, 2018, which claims priority to the foreign priority application JP2017/139046 filed on Jul. 18, 2017.

TECHNICAL FIELD

The present invention relates to an electrode, an energy storage device, and a method for manufacturing the electrode.

BACKGROUND ART

Secondary batteries typified by lithium ion secondary batteries are frequently used in electronic devices such as personal computers and communication terminals, motor vehicles and the like because of their high energy density. The secondary batteries generally have a pair of electrodes composed of a sheet-like positive electrode and a sheet-like negative electrode, and an electrolyte interposed between these electrodes and are configured to be charged and discharged as ions are transferred between both electrodes. In addition, capacitors such as lithium ion capacitors and electric double layer capacitors are widely diffused as energy storage devices other than secondary batteries.

The pair of electrodes usually forms an electrode assembly stacked or wound with a separator interposed therebetween. The separator has a function of electrically insulating the electrodes from each other and a function of retaining the electrolyte and moving ions between the electrodes. As the separator, a resin porous membrane is widely used.

As an alternative to such a separator or in order to be used together with a separator, an energy storage device including an electrode having a porous insulating layer formed on the surface of an active material layer has been proposed. This insulating layer is formed by applying a paste containing a filler, a binder, and a dispersion medium to the surface of an active material layer and drying the paste (see Patent Documents 1 to 3).

PRIOR ART DOCUMENTS

Patent Documents

Patent Document 1: JP-A-2013-97912
Patent Document 2: JP-A-2009-163942
Patent Document 3: WO 2005/011043 A

SUMMARY OF THE INVENTION

Problems to be Solved by the Invention

However, in a case in which the insulating layer is formed on the surface of an active material layer by so-called wet coating using a paste as in the above technique, there is a disadvantage that the high rate discharge performance of an energy storage device fabricated using the obtained electrode decreases since the electrolyte permeability of this electrode is low.

The present invention has been made based on the above circumstances, and an object thereof is to provide an electrode which suppresses a decrease in high rate discharge performance of an energy storage device fabricated using an electrode in which an insulating layer is layered on the surface of an active material layer, an energy storage device including this electrode, and a method for manufacturing this electrode.

Means for Solving the Problems

An aspect of the present invention made to solve the above problems is an electrode which includes an active material layer, and an insulating layer layered on a surface of the active material layer, in which the insulating layer contains a filler and a first binder, and a content of the first binder in the insulating layer is 8% by mass or more.

Another aspect of the present invention made to solve the above problems is an electrode which includes an active material layer, and an insulating layer layered on a surface of the active material layer, in which the insulating layer is a dry coating product containing a filler and a binder.

Still another aspect of the present invention made to solve the above problems is a method for manufacturing an electrode, which includes the steps of forming an active material layer, and laminating an insulator containing a filler and a binder on a surface of the active material layer to form an insulating layer, in which the insulator does not contain a solvent.

Advantages of the Invention

According to the present invention, it is possible to provide an electrode which suppresses a decrease in high rate discharge performance of an energy storage device fabricated using an electrode in which an insulating layer is layered on the surface of an active material layer, an energy storage device including this electrode, and a method for manufacturing this electrode.

MODE FOR CARRYING OUT THE INVENTION

Figure 1:
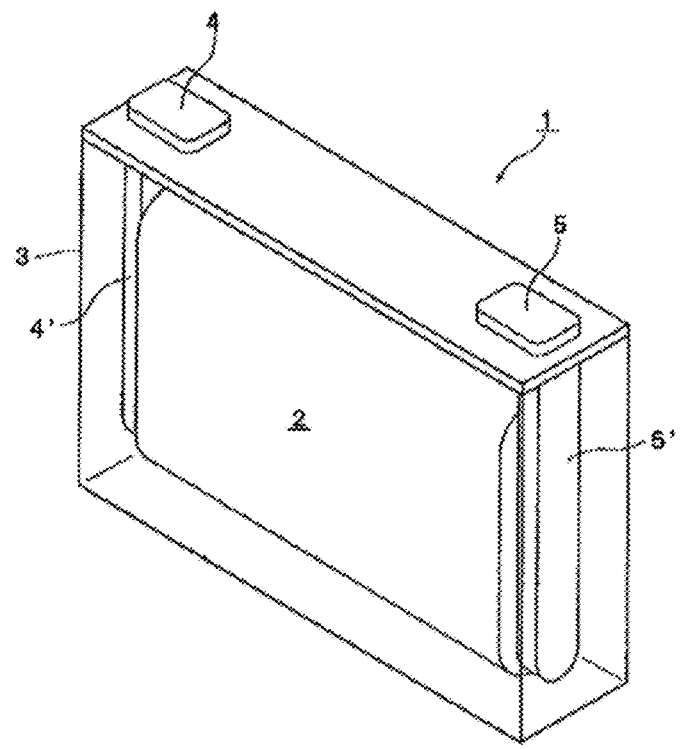
FIG. 1 is an external perspective diagram illustrating a nonaqueous electrolyte secondary battery according to an embodiment of an energy storage device of the present invention.

First, the outlines of an electrode, an energy storage device, and a method for manufacturing the electrode, which are disclosed in the present specification will be described.

An electrode according to an aspect of the present invention has an active material layer and an insulating layer layered on a surface of the active material layer, and the insulating layer contains a filler and a first binder and a content of the first binder in the insulating layer is 8% by mass or more.

According to this configuration, the high rate discharge performance of an energy storage device fabricated using an electrode in which an insulating layer is layered on the surface of an active material layer can be enhanced.

An electrode according to another aspect of the present invention has an active material layer and an insulating layer layered on a surface of the active material layer, and the insulating layer contains a dry coating product containing a filler and a first binder.

According to this configuration, the high rate discharge performance of an energy storage device fabricated using an electrode in which an insulating layer is layered on the surface of an active material layer can be enhanced.

Here, the content of the first binder in the insulating layer may be 8% by mass or more.

According to this configuration, the close contact property of the insulating layer can be secured.

Here, the dry coating product may contain a cured product of a powder in which the first binder is attached to the surface of the particulate filler.

According to this configuration, the binder is selectively present on the surface of the filler particles, and it is thus possible to secure a space between the filler particles and to enhance the electrolyte permeability in the insulating layer.

Here, the entire surface of the filler may be covered with the first binder.

According to this configuration, the binder is selectively present on the surface of the filler particles, and it is thus possible to secure a space between the filler particles and to enhance the electrolyte permeability in the insulating layer.

Here, the thickness of the insulating layer may be 3 μm or more.

According to this configuration, more sufficient insulation property can be exerted.

Here, the filler may contain an inorganic oxide or an inorganic hydroxide.

According to this configuration, thermal stability can be improved.

Here, the inorganic oxide or inorganic hydroxide may contain aluminum.

According to this configuration, the stability with respect to halide ions can be improved.

Here, the active material layer may contain a second binder, and the content of the first binder in the insulating layer may be greater than the content of the second binder in the active material layer.

According to this configuration, the electrolyte permeability in the active material layer can be secured.

An energy storage device according to another aspect of the present invention includes a positive electrode and a negative electrode, and at least one of the positive electrode and the negative electrode may include the electrode described above.

According to this configuration, the high rate discharge performance of energy storage device can be enhanced.

Here, a separator capable of being separated from the positive electrode and the negative electrode may not be included.

According to this configuration, favorable insulation performance can be exerted even when a separator is not included.

Here, the positive electrode and the negative electrode may be disposed so as to be in contact with each other and face each other.

According to this configuration, favorable insulation performance can be exerted even when the positive electrode and the negative electrode are in contact with each other and face each other.

Here, the melting point of the first binder may be 160° C. or less.

According to this configuration, the first binder can be easily melted.

Here, the first binder may contain an acrylic resin.

According to this configuration, the first binder can be more easily melted.

Here, a stacked electrode assembly in which a positive electrode and a negative electrode are stacked without being folded may be included.

According to this configuration, peeling off of the insulating layer can be suppressed.

Here, the negative electrode may include a negative active material containing a titanium-containing oxide.

According to this configuration, it is possible to suppress deposition of metal lithium on the negative electrode.

Here, the energy storage device may be an all-solid energy storage device.

According to this configuration, the productivity can be improved.

A method for manufacturing an electrode according to still another aspect of the present invention may be a method for manufacturing an electrode, which includes the steps of forming an active material layer, and laminating an insulator containing a filler and a binder on a surface of the active material layer to form an insulating layer, in which the insulator does not contain a solvent.

According to this configuration, it can be suppressed that the binder in the insulating layer flows into the active material layer when an insulating layer is formed.

Here, the insulator may be electrified in the step of laminating the insulator.

According to this configuration, it is possible to form a stable insulating layer with small variation in the thickness of the insulating layer.

Here, the insulator may contain a powder in which particles of the binder are attached to the surface of the particulate filler.

According to this configuration, the electrolyte permeability in the insulating layer can be improved.

Hereinafter, the electrode, the energy storage device, and the method for manufacturing an electrode according to an embodiment of the present invention will be described in detail. It should be noted that all technical terms used in the present specification are construed as having the same meaning as those commonly understood by those skilled in the art unless otherwise defined.

In the present specification, the "dry coating product" refers to a layer formed by dry coating. Incidentally, dry coating refers to a coating method in which a solvent is not used. A powder and a solvent are mixed to prepare a paste-like mixture and then the paste-like mixture is applied to the surface of the active material layer in conventional wet coating, but coating is performed in a powder state without forming the powder into a paste-like mixture in dry coating.

An electrode (a) according to an embodiment of the present invention is an electrode which includes an active material layer, and an insulating layer layered on the surface of the active material layer, in which the insulating layer is a dry coating product containing a filler and a binder.

The electrode (a) can enhance the high rate discharge performance of an energy storage device (hereinafter, simply referred to as "energy storage device" in some cases)

fabricated using an electrode in which an insulating layer is layered on the surface of an active material layer. The reason for this is not clear, but the following is assumed. As the insulating layer is a dry coating product, it is suppressed that the binder in the insulating layer flows into the active material layer when the insulating layer is formed. Incidentally, when the binder in the insulating layer flows into the active material layer, the flowed binder fills the pores of the porous active material layer, and the electrolyte permeability into the active material layer thus decreases. In contrast, in the electrode (a), the porous state of the active material layer and thus the electrolyte permeability are secured as the insulating layer is a dry coating product. It is assumed that the electrolyte permeability in the active material layer is secured in the electrode (a) in this manner and this can suppress a decrease in the high rate discharge performance of an energy storage device fabricated using an electrode in which an insulating layer is layered on the surface of an active material layer.

It is preferable that the dry coating product is a cured product of a powder in which the binder particles are attached to the surface of the filler particles. By this, the binder is selectively present on the surface of the filler particles, and it is thus possible to secure a space between the filler particles and to enhance the electrolyte permeability in the insulating layer.

It is also preferable that the entire surface of the filler particles is covered with the binder. By this, the binder is selectively present on the surface of the filler particles, and it is thus possible to secure a space between the filler particles and to further enhance the electrolyte permeability in the insulating layer.

It is also preferable that the content of the binder in the insulating layer is 8% by mass or more. The fact that the content of binder is high in the manner means that the binder in the insulating layer hardly flows into the active material layer at the time of insulating layer formation and the binder is retained in the insulating layer. By this, the electrolyte permeability in the active material layer is more sufficiently secured. Moreover, the close contact property of the insulating layer can be secured as the content of binder is high in this manner.

An electrode (b) according to an embodiment of the present invention is an electrode which includes an active material layer, and an insulating layer layered on the surface of the active material layer, in which the insulating layer contains a filler and a binder and the content of the binder in the insulating layer is 8% by mass or more.

In the electrode (b), the content of binder in the insulating layer is as high as 8% by mass or more. This means that the binder in the insulating layer hardly flows into the active material layer at the time of insulating layer formation and the binder is retained in the insulating layer. An insulating layer having a high binder content of 8% by mass or more can be achieved by being formed by dry coating. The close contact property of the insulating layer formed by dry coating can be secured as it is suppressed that the binder in the insulating layer flows into the active material layer when the insulating layer is formed and a sufficient amount of binder is retained in the insulating layer. As a result, peeling off of the insulating layer and the like can be prevented. On the other hand, in a case in which the insulating layer is formed by conventional wet coating, even if the content of binder is 8% by mass or more, the content of binder in the insulating layer decreases to be lower than 8% by mass as the binder flows into the active material layer.

Incidentally, the "content of binder" in the insulating layer is not the content of binder in the material (paste, powder, or the like) forming the insulating layer but refers to the content of binder in the insulating layer formed. The same applies to the content of binder in the active material layer. The content of binder in the layer is measured by actually analyzing the target layer and is specifically a value measured by the following method.

First, the active material layer or the insulating layer on the active material layer is peeled off from the electrode. The mass change and differential thermal change are measured when the layer peeled off is put into a platinum (Pt) cell, the temperature thereof is raised to 800° C. at a rate of temperature increase of 5° C./min in an air flow using "STA7200RV" manufactured by Hitachi High-Tech Corporation, and the state is then maintained for 10 min. The mass ratio decreased from the start to the end of the differential thermal peak of the binder is taken as the content of binder in the active material layer or the insulating layer on the active material layer.

An electrode (c) according to an embodiment of the present invention is an electrode which includes an active material layer, and an insulating layer layered on the surface of the active material layer, in which the active material layer contains a second binder, the insulating layer contains a filler and a first binder, and the content of the first binder in the insulating layer is greater than the content of the second binder in the active material layer.

In the electrode (c), the content of the first binder in the insulating layer is greater than the content of the second binder in the active material layer and this means that the binder in the insulating layer hardly flows into the active material layer at the time of insulating layer formation. For this reason, the porous state of the active material layer and thus the electrolyte permeability are secured by the electrode (c) as well. Moreover, such relation between the active material layer and the insulating layer can be achieved by forming the insulating layer on the surface of the active material layer by dry coating.

In an electrode (d) according to an embodiment of the present invention, the content of binder in the active material layer is 5% by mass or less, the porosity of the active material layer is 20% or more, and an insulating layer is layered on the surface of the active material layer.

The fact that the content of binder in the active material layer is 5% by mass or less and the porosity of the active material layer is 20% or more means that the binder is hardly present between the active material particles in the active material layer and there are a great number of voids. In a case in which such an active material layer is used, the binder in the insulating layer is likely to flow and the deterioration in high rate discharge characteristics tends to increase. Hence, it is possible to suppress flow of the binder in the insulating layer and to prevent the voids in the active material layer from being filled with the binder from the insulating layer by forming the insulating layer with a dry coating product.

In the electrodes (a) to (d), the average thickness of the insulating layer is preferably 3 μm or more. By this, more sufficient insulation property can be exerted. In addition, according to the electrodes (a) to (d), the energy storage device can exert favorable high rate discharge performance even when the average thickness of the insulating layer is set to 3 μm or more in this manner.

The electrodes (a) to (d) are preferably a positive electrode. The active material layer formed in the positive electrode exhibits relatively high surface smoothness due to a small particle size of positive active material and the like and is less expanded and contracted during charge and discharge than the active material of the negative electrode. For this reason, more favorable and stable insulation performance can be exerted and the like by forming the insulating layer in the positive electrode.

An energy storage device (a) according to an embodiment of the present invention is an energy storage device which includes a positive electrode, and a negative electrode, in which at least one of the positive electrode and the negative electrode is any one of the electrodes (a) to (d), and a separator capable of being separated from the positive electrode and the negative electrode is not included.

The energy storage device (a) includes any of the electrodes (a) to (d), thus can exert favorable insulation performance even without including a separator, and exhibits favorable high rate discharge performance.

Incidentally, the "separator" is a sheet which is present between the electrodes (between the positive electrode and the negative electrode) and exhibits electrical insulation property and porosity and refers to an independent one that is separable from the electrodes and does not accompany the electrode. In other words, a layer which is formed on the surface of the electrode by coating and exhibits electrical insulation property and porosity does not correspond to the separator since this layer accompanies the electrode.

An energy storage device (β) according to an embodiment of the present invention is an energy storage device which includes a positive electrode, and a negative electrode, in which at least one of the positive electrode and the negative electrode is any one of the electrodes (a) to (d), and the positive electrode and the negative electrode are disposed so as to be in contact with each other and face each other.

The energy storage device (β) includes any of the electrodes (a) to (d), thus can exert favorable insulation performance even when the positive electrode and the negative electrode are in contact with each other and face each other, and exhibits favorable high rate discharge performance.

Incidentally, the fact that the positive electrode and the negative electrode are in contact with each other and face each other means that a layer which is formed on the positive active material and exhibits electrical insulation property and porosity and the negative active material layer are in direct contact with each other and face each other, a layer which is formed on the negative active material and exhibits electrical insulation property and porosity and the positive active material layer are in direct contact with each other and face each other, or a layer which is formed on the positive active material and exhibits electrical insulation property and porosity and a layer which is formed on the negative active material and exhibits electrical insulation property and porosity are in direct contact with each other and face each other.

In a case in which the insulating layer is a dry coating product, it is possible to suppress flow of the binder in the insulating layer and to secure electrolyte permeability into the active material layer as described above, and the high rate discharge characteristics hardly decrease even when the thickness of the insulating layer is increased. In other words, by increasing the thickness of the insulating layer, the insulation between the positive electrode and the negative electrode can be reliably secured without decreasing the high rate discharge characteristics and a separator can be dispensed with. It is necessary to increase the thickness of the insulating layer in order to reliably secure insulation between the positive electrode and the negative electrode. In a case in which the insulating layer is a conventional wet coating product, the content of binder in the insulating layer increases when the thickness of the insulating layer is increased, thus the amount of binder flowing into the active material layer also increases in association with this, and as a result, a significant decrease in high rate discharge characteristics is observed.

In the energy storage device (α), the average thickness of the insulating layer is preferably 7 μm or more. By this, more favorable insulation performance can be exerted even when a separator is not included. In addition, according to the energy storage device (a), favorable high rate discharge performance can be exerted even when the average thickness of the insulating layer is set to 7 μm or more in this manner.

Hereinafter, the electrode, the energy storage device, and the method for manufacturing an electrode according to an embodiment of the present invention will be described in detail.

First Embodiment: Electrode

An electrode according to a first embodiment of the present invention includes an electrode substrate, an active material layer, and an insulating layer. The electrode is a layered structure in which the electrode substrate, the active material layer, and the insulating layer are layered in this order. The active material layer and the insulating layer may be layered only on one surface or both surfaces of the electrode substrate. In addition, there may be a region (non-covered portion) in which the active material layer and the insulating layer are not covered (layered) on the front and back surfaces of the electrode substrate. The electrode may be a positive electrode or a negative electrode but is preferably a highly smooth plate. In general, the particles of negative active material are large and the smoothness of the active material layer surface of the negative electrode is low. In contrast, the particles of positive active material are small particles and the smoothness of the active material layer surface of the positive electrode is high. For this reason, it is preferable that the electrode is a positive electrode.

(Electrode Substrate)

The electrode substrate exhibits conductivity. Incidentally, to exhibit "conductivity" means that the volume resistivity measured in conformity with JIS-H-0505 (1975) is 107 Ω·cm or less. In addition, the electrode substrate has a sheet shape.

In a case in which the electrode is a positive electrode, as the material for the electrode substrate (positive electrode substrate), a metal such as aluminum, titanium, or tantalum or any alloy thereof is used. Among these, aluminum and an aluminum alloy is preferable from the viewpoint of balance among potential resistance, high conductivity, and cost. In other words, an aluminum foil is preferable as the positive electrode substrate. Incidentally, examples of aluminum or aluminum alloy include A1085P and A3003P prescribed in JIS-H-4000 (2014). On the other hand, in a case in which the electrode is a negative electrode, as the material for the electrode substrate (negative electrode substrate), a metal such as copper, nickel, stainless steel, nickel-plated steel or any alloy thereof is used and copper or a copper alloy is preferable. In other words, a copper foil is preferable as the negative electrode substrate. Examples of the copper foil include a rolled copper foil and an electrolytic copper foil.

The average thickness of the electrode substrate can be set to, for example, 5 μm or more and 50 μm or less. Incidentally, the "average thickness" means an average value of thicknesses measured at arbitrary ten points. In the following, the same definition applies to the "average thicknesses" of other members and the like unless otherwise described. (Active Material Layer)

The active material layer is layered on the electrode substrate. The active material layer contains an active material and arbitrary components such as a conductive agent, a binder (second binder), a thickener, and a filler if necessary. As these respective components, known components used in a general active material layer can be used.

Examples of the active material (positive active material) in a case in which the electrode is a positive electrode include complex oxides ($Li_xCoO_2$, $Li_xNiO_2$, $LixMnO_3$, $LixNi\alpha Co_{(1-\alpha)}O_2$, $Li_xNi_\alpha Mn_\beta Co_{(1-\alpha-\beta)}O_2$, $Li_{1+w}Ni_\alpha Mn_\beta Co_{(1-\alpha-\beta-w)}O_2$ and the like having a layered $\alpha$-$NaFeO_2$ crystal structure, $Li_xMn_2O_4$, $Li_xNi_\alpha Mn_{(2-\alpha)}O_4$ and the like having a spinel crystal structure) represented by $Li_xMO_y$ (M denotes at least one transition metal) and polyanion compounds ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ and the like) represented by $Li_wMe_x(AO_y)_z$ (Me denotes at least one transition metal, A denotes, for example, P, Si, B, V or the like). The elements or polyanions in these compounds may be partially substituted with other elements or anion species. In the electrode mixture layer, one of these compounds may be used singly or two or more of these compounds may be used in mixture.

Examples of the active material (negative active material) in a case in which the electrode is a negative electrode include metals or metalloids such as S and Sn; metal oxides or metalloid oxides such as Si oxide and Sn oxide; lithium composite oxides such as $Li_4Ti_5O_{12}$ and $LiTiO_2$; titanium-containing oxides such as $Li_4Ti_5O_{12}$, $LiTiO_2$, $TiO_2$, and $TiNb_2O_7$; polyphosphate compounds; and carbon materials such as graphite (graphite) and amorphous carbon (easily graphitizable carbon or non-graphitizable carbon).

Among these, a carbon material is preferable from the viewpoint of energy density, and a titanium-containing oxide is preferable from the viewpoint of suppressing deposition of metal lithium in the negative electrode. In particular, a titanium-containing oxide is preferable since deposition of metal lithium in the negative electrode can be suppressed even when high rate discharge is performed. Furthermore, it is preferable to use a titanium-containing oxide since the smoothness of the active material layer surface is enhanced and the formation of insulating layer is facilitated. In addition, a titanium-containing oxide is preferable since a titanium-containing oxide exhibits low electron conductivity and it is easy to secure insulation property at the time of short circuit even in a case in which the insulating layer is thin.

Examples of the conductive agent include carbon materials and metals, but carbon materials are preferable. Examples of the carbon material include natural or artificial graphite, furnace black, acetylene black, and ketjen black.

As the binder (second binder), those that can fix an active material and the like and are electrochemically stable in the range of use are usually used. Examples of the binder include thermoplastic resins such as fluorine resins (polytetrafluoroethylene (PTFE), polyvinylidene fluoride (PVDF) and the like), acrylic resins (polymethyl methacrylate (PMMA) and the like), polyethylene (PE), polypropylene (PP), and polyimide; elastomers such as ethylene-propylene-diene rubber (EPDM), sulfonated EPDM, styrene butadiene rubber (SBR), and fluororubber; and polysaccharide polymers. Among these, a fluororesin is preferable and PVDF is more preferable from the viewpoint of heat resistance and the like. An acrylic resin having a low melting point is preferable and PMMA is more preferable from the viewpoint of manufacturability.

Examples of the thickener include polysaccharide polymers such as carboxymethylcellulose (CMC) and methylcellulose.

The filler is not particularly limited as long as it does not adversely affect the performance of energy storage device as a main component. Examples of the main component of the filler include polyolefins such as polypropylene and polyethylene, silica, alumina, zeolite, and glass.

The lower limit of the content of binder in the active material layer is, for example, 1% by mass and may be 2% by mass. The upper limit of the content of binder in the active material layer is, for example, 8% by mass and may be 5% by mass. In this manner, it is possible to secure favorable porosity of the active material layer by setting the content of binder in the active material layer to be low and to improve the electron conductivity by decreasing the amount of binder which is an insulator.

The average thickness of the active material layer can be set to, for example, 10 μm or more and 200 μm or less.

The upper limit of the porosity in the active material layer is preferably 40%, still more preferably 35%, and yet more preferably 30%. It is possible to increase the energy density of energy storage device by setting the porosity in the active material layer to be equal to or less than the upper limit. On the other hand, the lower limit of this porosity is preferably 15% by mass and still more preferably 20% by mass. By setting the porosity in the active material layer to be equal to or more than the lower limit, the electrolyte permeability is secured, the electrolyte solution filling time can be shortened, and this leads to an increase in efficiency of energy storage device manufacture.

Here, the porosity of layer (active material layer and insulating layer) is a value determined by the following equation.

Porosity (%)=(pore volume in layer/volume of layer)×100

Incidentally, the pore volume and volume of a layer are measured by a mercury intrusion method using a mercury porosimeter.

(Insulating Layer)

The insulating layer is layered on the surface (outer surface) of the active material layer. An insulating layer refers to a layer exhibiting insulation property. "Insulation property" means that the conductivity is lower than that of the electrode substrate and the active material layer. Specifically, to "exhibit insulation property" means that the resistance value of the insulating layer is increased by 50 times or more than the resistance value of the active material layer which does not have the insulating layer when the two-probe probe of a low resistivity meter "Loresta EP MCP T360" manufactured by Mitsubishi Chemical Analytech Co., Ltd. is pressed against an insulating layer or an active material layer which does not have an insulating layer and the surface resistance of both is measured. Apart of the insulating layer may also be layered on the surface of the electrode substrate which is not covered with the active material layer.

The insulating layer contains a filler and a binder (first binder). By this, insulation property can be exerted. The insulating layer may contain components other than the filler and the binder.

In the first embodiment of the present invention, the insulating layer is a dry coating product. The insulating layer is preferably a cured product of a powdery insulator. According to the electrode, as the insulating layer is formed by dry coating, more preferably by powder coating, the high rate discharge performance of an energy storage device fabricated using an electrode in which an insulating layer is layered on the surface of an active material layer can be enhanced.

The filler is a particle exhibiting insulation property. This filler may be either inorganic particles or organic particles, but inorganic particles are preferable from the viewpoint of heat resistance and the like. Examples of the inorganic particles include inorganic oxides such as silica, alumina, titania, zirconia, magnesia, ceria, yttria, zinc oxide, and iron oxide, inorganic nitrides such as silicon nitride, titanium nitride, and boron nitride, inorganic hydroxides such as aluminum hydroxide, in addition to these, silicon carbide, calcium carbonate, lithium carbonate, aluminum sulfate, potassium titanate, talc, kaolin clay, kaolinite, boehmite, halloysite, pyrophyllite, montmorillonite, sericite, mica, amesite, bentonite, asbestos, aluminosilicate, calcium silicate, magnesium silicate, diatom earth, silica sand, and glass. Among these, an inorganic oxide or an inorganic hydroxide is preferable since these materials are thermally stable and alumina is more preferable since this material exhibits high stability with respect to halide ions such as fluoride ions.

In the insulating layer, the filler is preferably layered in layers. The fact that the filler is layered in layers means that the respective particles of the filler are linearly arranged and one or a plurality of layers formed with a thickness of one particle are present in the cross-sectional view. Whether or not the filler is layered in layers can be determined by observing the cross section of the insulating layer under an electron microscope. As the filler is layered in layers, an insulating layer exhibiting excellent homogeneity can be formed and insulation can be secured even when the thickness of the insulating layer is thin.

The filler is preferably monodisperse particles. This makes it possible to relatively easily form an insulating layer in which the filler is layered in layers. The upper limit of the coefficient of variation in the particle size of the filler is preferably 0.2 and more preferably 0.12. On the other hand, it is more preferable as the lower limit thereof is smaller, but the lower limit is, for example, 0.01 and may be 0.05. Incidentally, the coefficient of variation in the particle size of the filler is calculated from the particle sizes of arbitrary 20 particles that can be confirmed from the electron microscope image of the cross section of the insulating layer. In addition, the particle size of each particle is an average value of the long diameter and the short diameter (diameter orthogonal to the long diameter).

The lower limit of the median diameter (D50) of the filler is preferably 0.5 μm and more preferably 1 μm, and 2 μm is more preferable in some cases. On the other hand, the upper limit thereof is preferably 10 μm and more preferably 5 μm. By setting the median diameter of the filler to the above range, the electrolyte permeability can be further enhanced while sufficient insulation property is maintained.

Incidentally, the "median diameter" means a value (D50) at which the volume standard integrated distribution calculated in conformity with JIS-Z-8819-2 (2001) is 50%. Specifically, a measured value by the following method can be taken as the median diameter. Measurement is performed using a laser diffraction particle size distribution measuring apparatus ("SALD-2200" manufactured by Shimadzu Corporation) as a measuring apparatus and Wing SALD-2200 as measurement control software. A scattering type measurement mode is adopted, and a wet cell in which a dispersion liquid in which a sample to be measured is dispersed in a dispersion solvent circulates is irradiated with laser light to attain a scattered light distribution from the measurement sample. Thereafter, the scattered light distribution is approximated by logarithmic normal distribution, and the particle size corresponding to a cumulative frequency of 50% (D50) is taken as the median diameter. Incidentally, it has been confirmed that the median diameter based on the above measurement almost coincides with the median diameter measured by extracting 100 particles from the electron microscope image while avoiding extremely large particles and extremely small particles.

As the binder (first binder), those that can fix the filler and the like and are electrochemically stable in the range of use are usually used. Examples of the binder include binders the same as those exemplified as a binder contained in the active material layer. Among these, a fluororesin is preferable and PVDF is more preferable from the viewpoint of heat resistance and the like. An acrylic resin having a low melting point is preferable and PMMA is more preferable from the viewpoint of manufacturability. The binder (second binder) in the active material layer and the binder (first binder) in the insulating layer may be the same as or different from each other.

The lower limit of the content of binder (first binder) in the insulating layer is preferably 5% by mass and more preferably 8% by mass. By setting the content of binder in the insulating layer to be equal to or more than the lower limit, the insulating layer is favorably in close contact with the active material layer and the insulation reliability can be enhanced. On the other hand, the upper limit of this content is preferably 50% by mass, more preferably 30% by mass, and still more preferably 20% by mass. By setting the content of binder in the insulating layer to be equal to or less than the upper limit, it is possible to secure proper voids between the filler particles while maintaining close contact property of the insulating layer.

In consideration of close contact property of the insulating layer, the preferable content of binder (first binder) in the insulating layer is affected by the kind of filler in the insulating layer. For example, in a case in which the filler is alumina, the lower limit of the content of binder is preferably 5% by mass and more preferably 8% by mass. On the other hand, the upper limit of the content in this case is preferably 25% by mass and more preferably 15% by mass. Alumina having a median diameter of about 3 μm (2 μm or more and 4 μm or less) can be suitably used as the filler. In addition, in a case in which the filler is boehmite, the lower limit of the content of binder is preferably 20% by mass and more preferably 25% by mass. On the other hand, the upper limit of the content in this case is preferably 40% by mass and more preferably 35% by mass. Boehmite having a median diameter of about 2 μm (1 μm or more and 3 μm or less) can be suitably used as the filler.

It is preferable that the content of binder (first binder) in the insulating layer is greater than the content of binder (second binder) in the active material layer. The lower limit of this difference in content may be, for example, 1% by mass, 2% by mass, or 3% by mass. On the other hand, the upper limit of this difference in content is, for example, 50% by mass and may be 30% by mass, 20% by mass, 10% by mass, or 6% by mass. By setting the content of binder in this manner, the favorable porous state of the active material layer and thus the favorable electrolyte permeability are secured and the high rate discharge performance of the energy storage device can be enhanced.

The lower limit of the average thickness of the insulating layer is preferably 3 µm, more preferably 4 µm, still more preferably 6 µm, and yet more preferably 7 µm. By setting the average thickness of the insulating layer to be equal to or more than the lower limit, more sufficient insulation property can be exerted. On the other hand, the upper limit thereof is, for example, 30 µm and may be 20 µm or 16 µm. By setting the average thickness of the insulating layer to be equal to or less than the upper limit, it is possible to achieve a decrease in the thickness, improvement in energy density, and the like of energy storage device. In addition, in the energy storage device, the high rate discharge performance of the energy storage device hardly decreases and favorable high rate discharge performance can be exerted even in a case in which a relatively thick insulating layer is formed.

Incidentally, the "average thickness of the insulating layer" is a value measured by the following method. The electron microscope images of cross sections at arbitrary three locations of the electrode covered with the insulating layer are observed, and the thickness of each cross section is measured at arbitrary three locations. The average value of the numerical values for all the locations (nine locations in total) measured is taken as the average thickness of the insulating layer.

The upper limit of the porosity in the insulating layer is preferably 70%, more preferably 50%, and still more preferably 35%. By setting the porosity in the insulating layer to be equal to or less than the upper limit, peeling off of the insulating layer is suppressed and insulation reliability can be enhanced. On the other hand, the lower limit of this porosity is preferably 5%, more preferably 10%, and still more preferably 15%. By setting the porosity in the insulating layer to be equal to or more than the lower limit, electrolyte permeability is secured and the high rate discharge performance of the energy storage device can be enhanced.

The porosity in the insulating layer and the porosity in the active material layer may be different from each other. The lower limit of this difference in porosity ((porosity in insulating layer)−(porosity in active material layer)) is preferably −40%, more preferably −20%, and still more preferably −10%. On the other hand, the upper limit of this difference in porosity is, for example, preferably 40%, more preferably 30%, and still more preferably 20%. By setting the porosity in this manner, the favorable porous state of the active material layer and insulating layer and thus the favorable electrolyte permeability are secured and the high rate discharge performance of the energy storage device can be enhanced. In addition, it is particularly preferable to set this difference in porosity to −10% or more and 20% or less since it is possible to suppress peeling off of the insulating layer as well as to secure the favorable porous state of the active material layer and insulating layer.

The electrode can be adopted as both a positive electrode and a negative electrode but is preferably used as a positive electrode. Moreover, the electrode can also be adopted in both a positive electrode and a negative electrode.

(Manufacturing Method)

The electrode can be manufactured, for example, by laminating an active material layer on the surface of an electrode substrate and laminating an insulating layer on the surface of this active material layer. The insulating layer is formed by coating the surface of the active material layer with a powder in which a filler and a binder are mixed or a powder in which a binder is attached to the surface of a particulate filler. By heating the insulating layer after coating, the binder is melted and the binding property in the insulating layer is generated.

The active material layer can be formed by a known method. For example, the active material layer can be formed by applying and drying a paste in which components constituting the active material layer are dispersed in water or an organic solvent.

The insulating layer is layered by dry coating. As the dry coating, electrostatic coating in which an electrified insulator is layered on the active material layer is preferable, powder coating (powder painting) using a powdery insulator is also preferable, and an electrostatic powder coating method in which the electrostatic coating and the powder coating are combined is still more preferable. Examples of the powder coating include a fluidized bed coating method.

In the powder coating, a powder in which a filler and a binder are mixed and a powder in which a binder is attached to the surface of a particulate filler can be used, but it is preferable to use a powder in which a binder is attached to the surface of a particulate filler. By selectively allowing the binder to be present on the surface of the filler, the binder present in the voids between the filler particles decreases, a space between the fillers can be secured, and the electrolyte permeability in the insulating layer is more favorable. Moreover, the binder can be uniformly distributed with respect to the thickness direction of the insulating layer by using the powder in which a binder is attached to the surface of a particulate filler.

In the powder coating, the powdery insulator is sprayed (scattered) on the active material layer using various feeders such as an airflow feeder and a vibration feeder. By heating the applied powdery insulator after spraying or simultaneously with spraying, the powdery insulator is fused and an insulating layer can be formed on the surface of the active material layer.

Incidentally, an electrostatic powder coating method in which the powder is electrified with static electricity at the time of spraying can be adopted. By using the electrostatic powder coating method, it is possible to efficiently form an insulating layer which exhibits higher uniformity and in which the filler is layered in layers and to form a stable insulating layer with small variation in the thickness of the insulating layer.

The dry coating can be performed using the method or apparatus described in JP-A-2014-137965, JP-A-2014-212072, and the like.

The coated insulating layer may be formed in a predetermined thickness dimension by being pressed using a press or a roller. Incidentally, the pressing step may be omitted in a case in which the thickness dimension of the insulating layer can be sufficiently set at the time of coating.

Second and Third Embodiments: Electrode

An electrode according to a second embodiment of the present invention is an electrode which includes an active material layer, and an insulating layer layered on the surface of the active material layer, in which the insulating layer contains a filler and a binder, and the content of the binder in the insulating layer is 8% by mass or more.

In addition, an electrode according to a third embodiment of the present invention is an electrode which includes an active material layer and an insulating layer layered on the surface of the active material layer, in which the active material layer contains a second binder, the insulating layer contains a filler and a first binder, and the content of the first binder in the insulating layer is greater than the content of the second binder in the active material layer.

The details or preferable forms of the electrodes according to the second and third embodiments are the same as those of the electrode according to the first embodiment of the present invention described above. The methods for manufacturing the electrodes according to the second and third embodiments are not particularly limited but can be suitably obtained by the method for manufacturing the electrode according to the first embodiment described above.

Fourth Embodiment: Energy Storage Device

An energy storage device according to a fourth embodiment of the present invention includes a positive electrode, a negative electrode, and a nonaqueous electrolyte. However, the energy storage device according to the fourth embodiment does not include a separator. In addition, in the energy storage device according to the fourth embodiment, the positive electrode and the negative electrode are disposed so as to be in contact with each other and face each other. Hereinafter, a lithium ion secondary battery, which is a nonaqueous electrolyte secondary battery, will be described as an example of the energy storage device. The positive electrode and the negative electrode form a stacked or wound electrode assembly. This electrode assembly is housed in a battery case, and the nonaqueous electrolyte is filled in this battery case. The nonaqueous electrolyte is interposed between the positive electrode and the negative electrode. Moreover, as the battery case, it is possible to use well-known metal battery cases, resin battery cases and the like that are usually used as a battery case of a nonaqueous electrolyte secondary battery.

(Positive Electrode and Negative Electrode)

At least one of the positive electrode and the negative electrode is the electrode according to an embodiment of the present invention described above. Incidentally, an electrode other than the electrode according to an embodiment of the present invention can be used as one of the positive electrode and the negative electrode. Examples of such an electrode include an electrode in which an insulating layer is not layered and an electrode in which an insulating layer is formed by wet coating.

Incidentally, in a case in which an insulating layer is formed in both the positive electrode and the negative electrode, the average thicknesses and compositions of these insulating layers may be the same as or different from each other. For example, by changing the average thicknesses and compositions of the insulating layer of the positive electrode and the insulating layer of the negative electrode, the insulation property and high rate discharge performance can be further optimized.

As the electrode assembly, there is a wound electrode assembly in which a positive electrode and a negative electrode are wound or a stacked electrode assembly in which a positive electrode and a negative electrode are stacked. In the energy storage device, there is a possibility that the insulating layer is easily peeled off by folding the plate on which an insulating layer is layered. Hence, it is preferable to adopt a stacked electrode assembly in which the plate is not folded rather than a wound electrode assembly in which the plate is folded. By adopting a stacked electrode assembly, peeling off of the insulating layer can be suppressed. Incidentally, as the stacked electrode assembly, one in which a plate on which an insulating layer is not layered is folded and stacked in a bellows shape in a state in which a plate on which an insulating layer is layered is sandwiched without being folded.

In the energy storage device, the lower limit of the average thickness of the insulating layer may be, for example, 3 μm but is preferably 7 μm and may be 10 μm or 15 μm. By setting the average thickness of the insulating layer to be equal to or more than the lower limit, more favorable insulation performance can be exerted even when a separator is not included. Moreover, more favorable insulation performance can be exerted even when the positive electrode and the negative electrode are disposed so as to be in contact with each other and face each other. In addition, according to the energy storage device, favorable high rate discharge performance can be exerted even when the average thickness of the insulating layer is set to be thick in this manner. Incidentally, the upper limit of this average thickness of the insulating layer can be set to, for example, 50 μm.

In addition, in a conventional energy storage device including a separator, a separator which is thermally contracted when being heated to about 110° C. to 160° C. is generally used. For this reason, when the melting point of the binder contained in the insulating layer is 160° C. or less, the insulating layer may be deformed and peeled off from the active material layer in a case in which the separator is thermally contracted. In contrast, the energy storage device of the present embodiment does not include a separator, and thus the melting point of the binder contained in the insulating layer can be set to 160° C. or less.

It is preferable to set the melting point of the binder contained in the insulating layer to 160° C. or less since it is easy to melt the binder contained in the insulating layer. Examples of the binder having a melting point of 160° C. or less include polyolefin resins such as polyethylene (PE) and polypropylene (PP) and acrylic resins such as polymethyl methacrylate (PMMA).

(Nonaqueous Electrolyte)

As the nonaqueous electrolyte, a known nonaqueous electrolyte usually used in a nonaqueous electrolyte secondary battery can be used. As the nonaqueous electrolyte, one in which an electrolyte salt is dissolved in a nonaqueous solvent can be used.

Examples of the nonaqueous solvent include cyclic carbonates such as ethylene carbonate (EC), propylene carbonate (PC), and butylene carbonate (BC) and chain carbonates such as diethyl carbonate (DEC), dimethyl carbonate (DMC), and ethyl methyl carbonate (EMC).

Examples of the electrolyte salt include lithium salts, sodium salts, potassium salts, magnesium salts, and onium salts, and lithium salts are preferable. Examples of the lithium salts include inorganic lithium salts such as $LiPF_6$, $LiPO_2F_2$, $LiBF_4$, $LiClO_4$, and $LiN(SO_2F)_2$ and lithium salts having a fluorinated hydrocarbon group such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$.

Moreover, ordinary temperature molten salts, ionic liquids and the like can also be used as the nonaqueous electrolyte.

Moreover, a solid electrolyte may be used as the nonaqueous electrolyte, and a nonaqueous electrolyte and a solid electrolyte may be used concurrently.

The solid electrolyte can be arbitrary materials which exhibit ionic conductivity such as lithium, sodium, and calcium and are solid at normal temperature, for example, 15° C. to 25° C. Examples of the solid electrolyte include a sulfide solid electrolyte, an oxide solid electrolyte, an oxynitride solid electrolyte, and a polymer solid electrolyte.

Examples of the sulfide solid electrolyte include $Li_2S$—$P_2S_5$-based solid electrolytes, for example, in the case of a lithium ion battery. More specifically, examples of the sulfide solid electrolyte include $Li_2S$—$P_2S_5$, $LiI$—$Li_2S$—$P_2S_5$, and $Li_{10}Ge$—$P_2S_{12}$.

The energy storage device according to the fourth embodiment does not include a separator. Moreover, the positive electrode and the negative electrode are disposed so as to be in contact with each other and face each other. Hence, the ion resistance of lithium ions and the like between the electrodes in the energy storage device can be decreased as compared with that in a conventional energy storage device including a polyolefin separator. For this reason, a higher effect can be attained by using a nonaqueous electrolyte having a higher ionic conductivity. Specifically, the content of cyclic carbonate in the nonaqueous solvent is preferably 10% by volume or more and 50% by volume or less. As the cyclic carbonate, ethylene carbonate is particularly preferable. Moreover, it is still more preferable that the nonaqueous solvent contains dimethyl carbonate or diethyl carbonate. The concentration of the electrolyte salt in the nonaqueous electrolyte is preferably 0.8 mol/L to 1.4 mol/L.

Other Embodiments

In the energy storage device according to the fourth embodiment, a form in which a separator is not included has been described, but the energy storage device is not hindered from including a separator. The insulation reliability can be further enhanced as a separator is included. For example, even in a case in which a part of the insulating layer falls off and a defect is generated, favorable insulation property can be exerted by the presence of separator. Furthermore, a shutdown function can also be imparted by using a resin separator as a separator.

In the energy storage device according to the fourth embodiment, a form in which one in which an electrolyte salt is dissolved in a nonaqueous solvent is used as a nonaqueous electrolyte has been described, but an embodiment of the present invention may be an all-solid energy storage device in which a solid electrolyte is used as a nonaqueous electrolyte. An all-solid energy storage device refers to an energy storage device of which the constituent components are solid at normal temperature, for example, 15° C. to 25° C. As the energy storage device is an all-solid energy storage device, a flammable nonaqueous solvent is not used in the energy storage device, thus the safety apparatus can be simplified, manufacturing cost can be cut down, the productivity can be improved, and the like.

(Separator)

The separator is not particularly limited, and a known separator for energy storage device can be used. As the material for the separator, for example, a woven fabric, a nonwoven fabric, a porous resin film, and the like are used. Among these, a porous resin film is preferable. The main component of the porous resin film is, for example, preferably polyolefins such as polyethylene and polypropylene from the viewpoint of strength. Moreover, porous resin films in which these resins are compounded with resins such as aramid and polyimide may be used. Moreover, a separator containing an inorganic filler and a separator in which an inorganic layer is layered on a porous resin film can also be used.

The present invention is not limited to the embodiments and can be implemented in an aspect in which various changes and improvements are made in addition to the aspects. In the embodiments, the description has been made mainly on the form in which the energy storage device is a nonaqueous electrolyte secondary battery, but the energy storage device may be other energy storage devices. Examples of other energy storage devices include capacitors (electric double layer capacitors, lithium ion capacitors). Furthermore, the energy storage device may be an energy storage device in which the electrolyte is an aqueous solution. Moreover, in the electrode, an intermediate layer containing a conductive agent and a binder may be included between the electrode substrate and the active material layer.

FIG. 1 illustrates a schematic diagram of a rectangular nonaqueous electrolyte secondary battery 1 which is an embodiment of the energy storage device according to the present invention. Incidentally, the interior of the battery case is seen through in the figure. In the nonaqueous electrolyte secondary battery 1 illustrated in FIG. 1, an electrode assembly 2 is housed in a battery case 3. The electrode assembly 2 is formed by winding a positive electrode including a positive active material and a negative electrode including a negative active material with a separator interposed therebetween if necessary. The positive electrode is electrically connected to a positive electrode terminal 4 via a positive electrode lead 4', and the negative electrode is electrically connected to a negative electrode terminal 5 via a negative electrode lead 5'.

Figure 2:
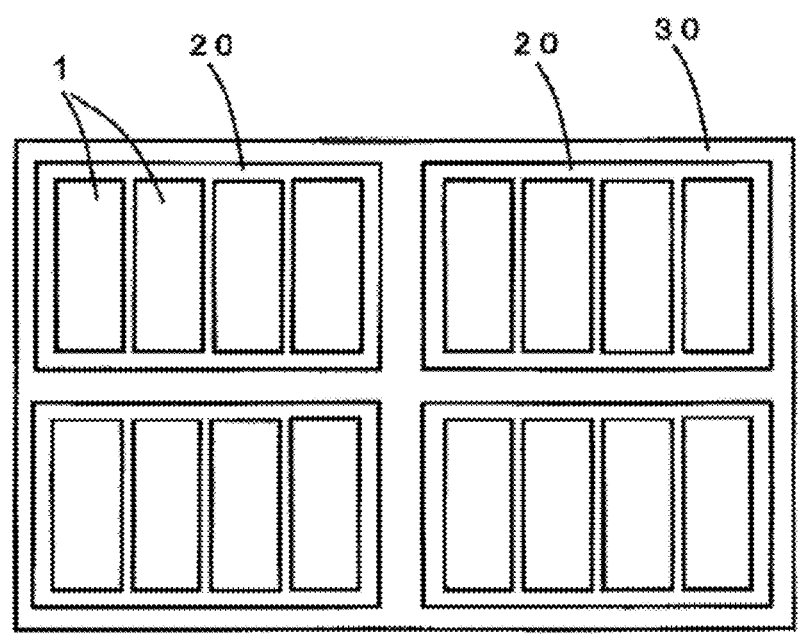
FIG. 2 is a schematic diagram illustrating an energy storage apparatus configured by assembling a plurality of nonaqueous electrolyte secondary batteries according to an embodiment of an energy storage device of the present invention.

The configuration of the energy storage device according to the present invention is not particularly limited, and a cylindrical energy storage device, a prismatic energy storage device (rectangular energy storage device), a flat energy storage device and the like are mentioned as an example thereof. An embodiment of the present invention can also be realized as an energy storage apparatus including a plurality of energy storage devices described above. An embodiment of the energy storage apparatus is illustrated in FIG. 2. In FIG. 2, an energy storage apparatus 30 includes a plurality of energy storage units 20. Each energy storage unit 20 includes a plurality of nonaqueous electrolyte secondary batteries 1. The energy storage apparatus 30 can be mounted as a power source for motor vehicles such as an electric vehicle (EV), a hybrid vehicle (HEV), and a plug-in hybrid vehicle (PHEV).

EXAMPLES

Hereinafter, the present invention will be described more specifically with reference to Examples, but the present invention is not limited to the following Examples.

Example 1

(Fabrication of Positive Electrode)

An active material layer was formed on the surface of one side of an aluminum foil having a thickness of 15 μm as a positive electrode substrate using a positive electrode paste in which a lithium-transition metal composite oxide ($LiNi_{1/3}Co_{1/3}Mn_{1/3}O_2$) and a lithium-transition metal composite oxide ($LiMn_2O_4$) as a positive active material and polyvinylidene fluoride (PVDF) as a binder were dispersed in an organic solvent. The PVDF content among the solids contents in the positive electrode paste was set to 4% by mass. The active material layer formed had a porosity of 30% and an average thickness of 80 μm.

Moreover, composite filler particles (powder for powder coating) in which PVDF particles are attached to the surface of alumina particles were fabricated by mixing alumina having a particle size (D50) of 3 μm as a filler and polyvinylidene fluoride (PVDF) as a binder together at a mass ratio of 90:10 by mechano-fusion. By an electrostatic coating method using these composite filler particles, an insulating layer was formed on the surface of the active material layer, and the positive electrode (electrode) of Example 1 was obtained. In other words, the composite filler particles were electrified, then sprayed on the active material layer, and heated to form an insulating layer. Incidentally, the coefficient of variation in the particle size of alumina as a filler in the insulating layer was measured by the method described above. The measured value was 0.11. Moreover, the insulating layer formed had a porosity of 70% and an average thickness of 4 μm.

(Negative Electrode)

A negative electrode was fabricated by bonding a lithium metal foil having a thickness of 300 μm on both surfaces of a stainless steel (designation: SUS316) mesh current collector (negative electrode substrate) to which stainless steel (designation: SUS316) terminals were attached and pressing the bonded body.

(Reference Electrode)

A reference electrode was fabricated by attaching a lithium metal piece to the tip of a stainless steel (designation: SUS316) current collector rod.

(Nonaqueous Electrolyte)

A nonaqueous electrolyte was prepared by dissolving lithium perchlorate ($LiClO_4$) in a solvent in which ethylene carbonate and diethyl carbonate are mixed so as to be at 50% by volume and 50% by volume, respectively, so that the salt concentration was 1.0 mol/L. The amount of moisture in the nonaqueous electrolyte was set to 20 ppm or less.

(Assembly of Energy Storage Device)

A glass nonaqueous electrolyte energy storage device was assembled in an Ar box with a dew point of −40° C. or less. The respective plates were fixed by sandwiching the positive electrode, the negative electrode, and the reference electrode, which were cut to have the same area, in a gold-plated clip in which the respective lead wire portions for the positive electrode, the negative electrode, and the reference electrode are previously fixed to the lid portion of the case one by one. At this time, the respective plates were fixed so that the active material layer of the positive electrode and the active material layer (lithium metal foil) of the negative electrode faced each other. The reference electrode was fixed at a position to be the back side of the positive electrode when viewed from the negative electrode. Next, a polypropylene cup containing a certain amount of nonaqueous electrolyte was installed in a glass case, and the lid was put so that the positive electrode, the negative electrode, and the reference electrode were immersed therein to assemble a nonaqueous electrolyte energy storage device (energy storage device).

Examples 2 to 51

A positive electrode of Example 2 in which the average thickness of the insulating layer is 6 µm, a positive electrode of Example 3 in which the average thickness of the insulating layer is 8 µm, a positive electrode of Example 4 in which the average thickness of the insulating layer is 14 µm, and a positive electrode of Example 5 in which the average thickness of the insulating layer is 16 µm were respectively obtained similarly to Example 1 except that the amount of the composite filler particles sprayed was changed. Moreover, energy storage devices of Examples 2 to 5 were respectively obtained similarly to Example 1 except that these positive electrodes were used.

Comparative Example 1

A positive electrode and an energy storage device of Comparative Example 1 were obtained similarly to Example 1 except that an insulating layer having an average thickness of 10 µm was formed by wet coating using a paste in which alumina having a particle size ($D_{50}$) of 3 µm as a filler and polyvinylidene fluoride (PVDF) were dispersed in an organic solvent at a mass ratio of 90:10.

Figure 3:
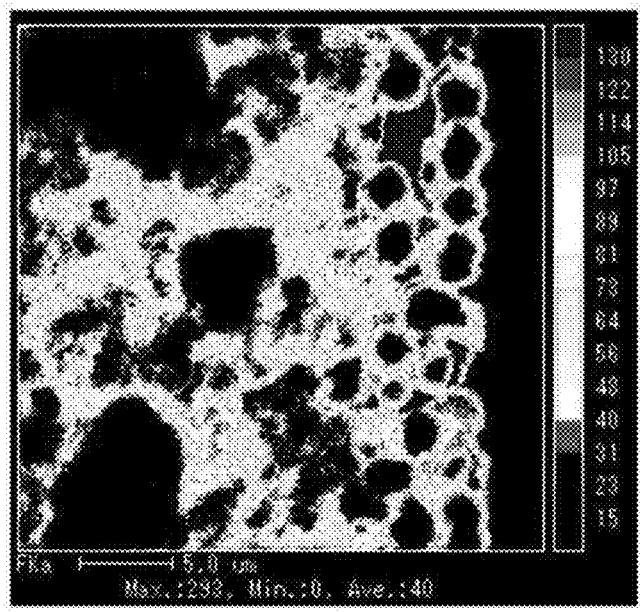
FIG. 3 is an electron microscope image of a cross section of a positive electrode in Example 1.
Figure 4:
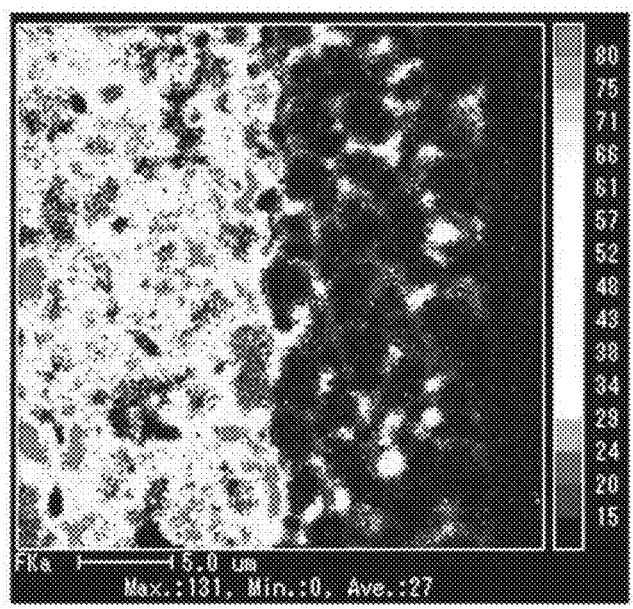
FIG. 4 is an electron microscope image of a cross section of a positive electrode in Comparative Example 1.

FIG. 3 illustrates an electron microscope image of the positive electrode cross section of Example 1 and FIG. 4 illustrates an electron microscope image of the positive electrode cross section of Comparative Example 1, respectively. In FIGS. 3 and 4, the portion having a high whiteness mainly indicates the binder. In the positive electrode of Comparative Example 1 in FIG. 4, it can be seen that the binder hardly remains in the insulating layer on the right side but the binder is filled in a great number of portions between the particles of the active material layer on left side. On the other hand, in the positive electrode of Example 1 in FIG. 3, it can be seen that the binder sufficiently remains in the insulating layer on the right side but the amount of binder present between the particles of the active material layer is small. Furthermore, it can be seen that the entire surface of the filler particles is covered with the binder in the insulating layer on the right side.

(Measurement of PVDF Content)

For the respective positive electrodes of Examples 1 to 5 and Comparative Example 1, the contents of binder in the active material layer and the insulating layer were measured. The mass change and differential thermal change were measured when the insulating layer peeled off from each positive electrode was put into a platinum (Pt) cell, the temperature thereof was raised to 800° C. at a rate of temperature increase of 5° C./min in an air flow using "STA7200RV" manufactured by Hitachi High-Tech Corporation, and the state was then maintained for 10 min. From the measurement data, the mass ratio of PVDF decreased from the start to the end of the differential thermal peak was calculated, and the PVDF content was determined. The mass change and differential thermal change in the active material layer were also measured in the same manner, and the PVDF content was determined. The results are presented in Table 1.

In Examples 1 to 5 in which the insulating layer is formed by dry coating, it can be seen that the binder content in the insulating layer is not significantly decreased from the binder content in the insulating layer-forming material. On the other hand, in Comparative Example 1 in which the insulating layer is formed by wet coating, a DTA peak attributed to the binder has not been detected in the insulating layer. In other words, the binder content in the insulating layer in Comparative Example 1 is extremely low and it is assumed that the binder content does not reach 1% by mass even when being estimated more. This is considered to be due to the fact that the binder in the insulating layer-forming material flows into the active material layer during coating in the wet coating. Incidentally, such an inflow of binder into the active material layer (increase in binder content in the active material layer) in Comparative Example 1 has not been confirmed as a measured value. This is considered to be due to the fact that the active material layer (average thickness: 80 µm) is formed to be sufficiently thick as compared with the insulating layer (average thickness: 10 µm) and the amount of binder increased in the active material layer is an amount that hardly affects the content, and the like.

[Evaluation]

(Test for 0.2 C Discharge Capacity Confirmation)

For the respective energy storage devices, constant current constant voltage charge was performed at a charge current of 0.2 C in the constant current process and an end-of-charge voltage of 4.2V at 25° C. for a charge time of 10 hours, and then a pause period of 10 minutes was provided. Thereafter, constant current discharge was performed at a discharge current of 0.2 C and an end-of-discharge voltage of 3.0 V and then a pause period of 10 minutes was provided. This charge-discharge was performed one cycle, and the discharge capacity was taken as the 0.2 C discharge capacity.

(Test for 1 C, 2 C, 3 C, and 5 C Discharge Capacity Confirmation)

Subsequently, constant current constant voltage charge was performed at a charge current of 0.2 C in the constant current process and an end-of-charge voltage of 4.2V at 25° C. for a charge time of 10 hours, and then a pause period of 10 minutes was provided. Thereafter, constant current discharge was performed at a discharge current of 1 C, 2 C, 3 C, or 5 C and an end-of-discharge voltage of 3.0 V, and the respective discharge capacities at this time were taken as the 1 C discharge capacity, 2 C discharge capacity, 3 C discharge capacity, and 5 C discharge capacity.

The percentages of the "1 C discharge capacity", "2 C discharge capacity", "3 C discharge capacity", and "5 C discharge capacity" with respect to the "0.2 C discharge capacity" were taken as the "high rate discharge performance (%)". The results are presented in Table 1.

TABLE 1

| | Binder content (% by mass) | | | High rate discharge performance (ratio to 0.2 C discharge capacity: %) | | | |
|---|---|---|---|---|---|---|---|
| | Insulating layer-forming material before coating (ratio to solids contents) | Insulating layer | Active material | 1 C | 2 C | 3 C | 5 C |
| Example 1 (average thickness: 4 μm) | 10 | 8 | 4 | 97.5 | 93.7 | 76.5 | 33.3 |
| Example 2 (average thickness: 6 μm) | 10 | 8 | 4 | 97.7 | 93.8 | 76.3 | 33.8 |
| Example 3 (average thickness: 8 μm) | 10 | 8 | 4 | 97.7 | 94.1 | 76.3 | 34.9 |
| Example 4 (average thickness: 14 μm) | 10 | 8 | 4 | 97.8 | 94.0 | 75.9 | 33.8 |
| Example 5 (average thickness: 16 μm) | 10 | 8 | 4 | 97.8 | 94.1 | 75.0 | 34.0 |
| Comparative Example 1 | 10 | * | 4 | 96.9 | 71.4 | 43.6 | 17.6 |

* DTA peak attributed to binder has not been detected.

As presented in Table 1 above, it can be seen that the energy storage devices of Examples 1 to 5 have superior high rate discharge performance as compared with that of Comparative Example 1. Moreover, when Examples 1 to 5 are compared with each other, it can be seen that the high rate discharge performance is substantially hardly decreased even when the thickness of the insulating layer is increased.

INDUSTRIAL APPLICABILITY

The present invention can be applied to energy storage devices used as a power source of electronic devices such as personal computers and communication terminals, motor vehicles and the like, electrodes for energy storage devices to be included in these energy storage devices, and the like.

DESCRIPTION OF REFERENCE SIGNS

1: Nonaqueous electrolyte secondary battery
2: Electrode assembly
3: Battery case
4: Positive electrode terminal
4': Positive electrode lead
5: Negative electrode terminal
5': Negative electrode lead
20: Energy storage unit
30: Energy storage apparatus

The invention claimed is:

1. A method for manufacturing an electrode, comprising the steps of:
   forming an active material layer; and
   laminating an insulator containing a filler and a binder on a surface of the active material layer to form an insulating layer,
   wherein the insulator does not contain a solvent, and
   the insulator is electrified in the step of laminating an insulator.

2. The method for manufacturing an electrode according to claim 1, wherein the insulator contains a powder in which particles of the binder are attached to a surface of the filler.

* * * * *